US009784886B2

(12) United States Patent
Yu et al.

(10) Patent No.: US 9,784,886 B2
(45) Date of Patent: Oct. 10, 2017

(54) REAL-TIME DOWNHOLE PROCESSING AND DETECTION OF BED BOUNDARY

(71) Applicant: Halliburton Energy Services, Inc., Houston, TX (US)

(72) Inventors: Wenshan Yu, Houston, TX (US); Yumei Tang, Tomball, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/396,722

(22) Filed: Jan. 2, 2017

(65) Prior Publication Data

US 2017/0146692 A1    May 25, 2017

Related U.S. Application Data

(63) Continuation of application No. 13/881,624, filed as application No. PCT/US2011/032895 on Apr. 18, 2011, now Pat. No. 9,534,485.

(51) Int. Cl.

| | |
|---|---|
| *G01V 3/24* | (2006.01) |
| *G01V 3/26* | (2006.01) |
| *G01V 99/00* | (2009.01) |
| *E21B 41/00* | (2006.01) |
| *E21B 49/00* | (2006.01) |
| *E21B 47/12* | (2012.01) |

(52) U.S. Cl.
CPC ........ *G01V 99/005* (2013.01); *E21B 41/0092* (2013.01); *E21B 47/12* (2013.01); *E21B 49/00* (2013.01); *G01V 3/24* (2013.01); *G01V 3/26* (2013.01)

(58) Field of Classification Search
None
See application file for complete search history.

(56) References Cited

U.S. PATENT DOCUMENTS

| | | | | |
|---|---|---|---|---|
| 6,163,155 A | * | 12/2000 | Bittar | G01V 3/28 324/338 |
| 7,057,392 B2 | * | 6/2006 | Wang | G01V 3/28 324/338 |
| 7,382,135 B2 | * | 6/2008 | Li | G01V 3/30 324/338 |

(Continued)

*Primary Examiner* — Huan Tran
(74) *Attorney, Agent, or Firm* — Gilliam IP PLLC

(57) ABSTRACT

Techniques for processing down hole information including detecting bed boundaries are disclosed. In some embodiments, a bottom hole assembly includes a down hole tool and a processing apparatus. The down hole tool includes at least one antenna pair to determine resistivity data during rotation of the down hole tool. The processing apparatus is attached to the down hole tool and includes a machine-readable medium that stores a formation model database comprising multiple formation models. The processing apparatus further includes a processor that executes program code to receive the resistivity data during down hole operation of the down hole tool, and to solve for at least resistivity formation parameters using a selected one of the formation models and a selected portion of the received resistivity data. The processor further executes program code to update the selected formation model based, at least in part, on the resistivity formation parameters.

20 Claims, 7 Drawing Sheets

(56) References Cited

U.S. PATENT DOCUMENTS

| | | | | |
|---|---|---|---|---|
| 7,659,722 | B2* | 2/2010 | Bittar | G01V 3/28 |
| | | | | 324/337 |
| 9,534,485 | B2* | 1/2017 | Yu | G01V 3/24 |
| 2004/0154831 | A1* | 8/2004 | Seydoux | E21B 7/04 |
| | | | | 175/24 |
| 2008/0224707 | A1* | 9/2008 | Wisler | G01V 3/28 |
| | | | | 324/338 |
| 2010/0286916 | A1* | 11/2010 | Wang | G01V 3/20 |
| | | | | 702/9 |
| 2011/0084697 | A1* | 4/2011 | Wisler | G01V 3/28 |
| | | | | 324/346 |

* cited by examiner

| | Formation Models | | | | | Evaluation Parameters | | | |
|---|---|---|---|---|---|---|---|---|---|
| Curve Name | $R_{S1}$ Layer | $R_t$ Reservoir | $R_{S2}$ Layer | Dip Angle | H | Sensitive Range (2 Layer) | Sensitive Range (3 Layer) | Signal-noise Ratio (2 Layer) | Signal-noise Ratio (3 Layer) |
| 16in 2Mhz | 10 | 50 | 10 | 80 | 20 | 1.96ft | 1.96ft | 0.02 | 0.02 |
| 32in 2Mhz | 10 | 50 | 10 | 80 | 20 | 6.13ft | 6.13ft | 0.14 | 0.14 |
| 96in 2Mhz | 10 | 50 | 10 | 80 | 20 | 11.18ft | 8.07ft | 0.12 | 0.12 |
| 16in 500khz | 1 | 20 | 1 | 80 | 20 | 3.30ft | 3.30ft | 0.11 | 0.11 |
| 32in 500khz | 1 | 20 | 1 | 80 | 20 | 7.51ft | 7.38ft | 0.66 | 0.66 |
| 96in 500khz | 1 | 20 | 1 | 80 | 20 | 11.70ft | 8.98ft | 1.76 | 1.85 |

FIG. 1

REAL-TIME DOWNHOLE PROCESSING AND DETECTION OF BED BOUNDARY

This application is a Continuation of U.S. application Ser. No. 13/881,624, filed on 25 Apr. 2013 which is a U.S. National Stage Filing under 35 U.S.C. 371 from International Application No. PCT/US2011/032895, filed on 18 Apr. 2011, and published as WO 2012/144981 A1 on 26 Oct. 2012, which applications and publication are incorporated herein by reference in their entirety.

BACKGROUND

Understanding the structure and properties of geological formations, to include detection of formation boundaries, can reduce the cost of drilling wells for oil and gas exploration. Measurements made in a borehole (i.e., down hole measurements) are typically performed to attain this understanding, and the data resulting from these measurements is often transmitted to the surface for processing and analysis. However, due to the distance over which the information is sent, the transmission bandwidth is often limited in a significant way, reducing the amount of information that can be sent to the surface over a given time interval.

BRIEF DESCRIPTION OF THE DRAWINGS

FIG. 1 illustrates a database of reservoir models used within formations having different characteristics according to various embodiments of the invention.

DETAILED DESCRIPTION

Figure 2:
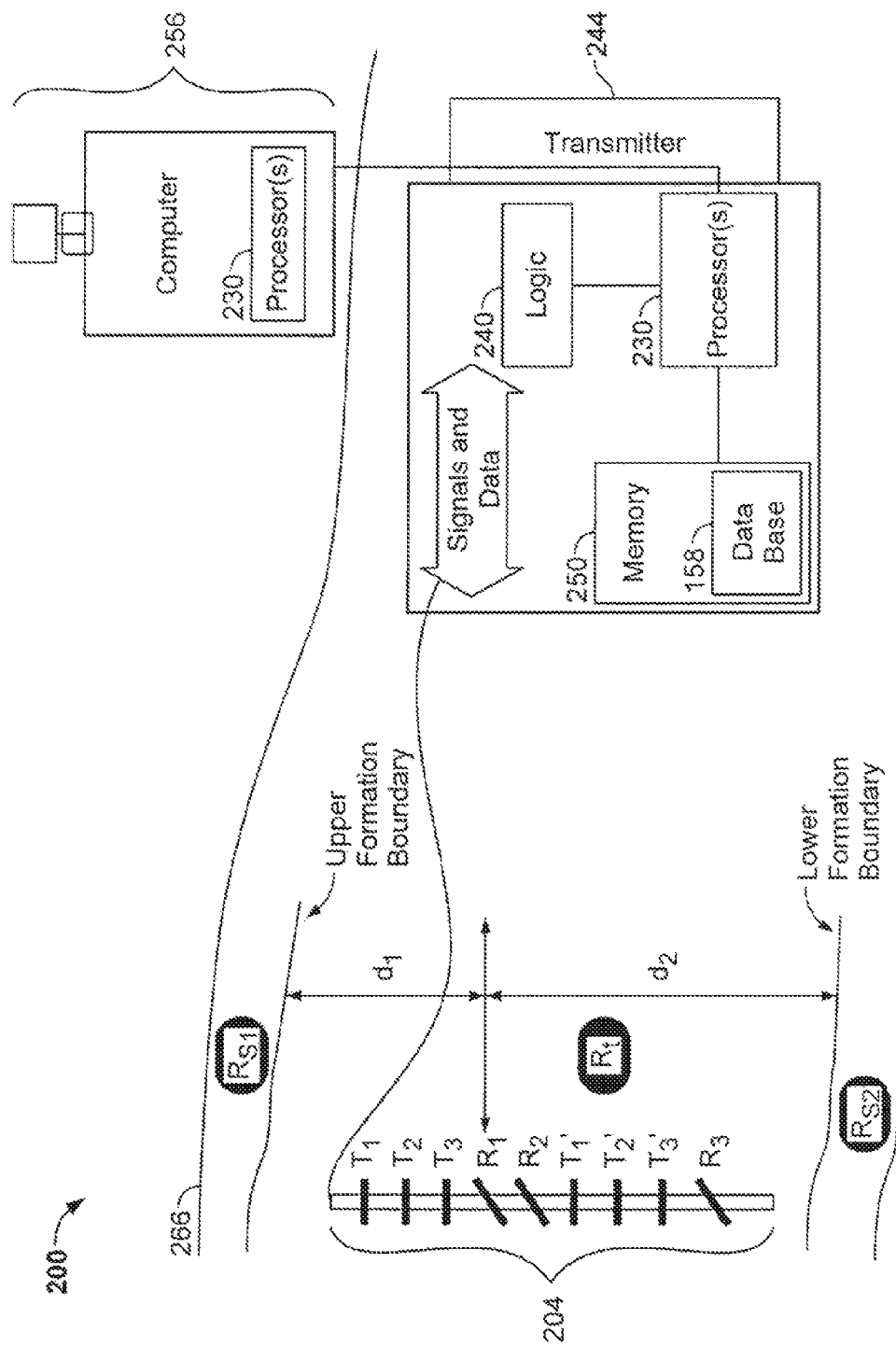
FIG. 2 is a block diagram of apparatus according to various embodiments of the invention.

In some embodiments, a signal picking method is presented that can provide robust inversion with respect to directional logging while drilling (LWD) or measurement while drilling (MWD) operations. This methodology can be embedded in a logging tool to provide real-time signal choice, along with measurements that reference useful values of resistivity for bed boundary detection in boreholes. The decision to choose one of several available borehole measurements can be made using a response sensitivity based on antenna spacing and frequency, along with various formation parameters. The solution provided by the inversion process can be used to more accurately guide drilling operations down hole.

In the field of petroleum wireline logging and LWD/MWD, electromagnetic resistivity tools have been widely used to explore the subsurface based on the electrical resistivity of the rock formation. The formation with a relatively high resistivity implies a greater possibility of hydrocarbon accumulation.

A resistivity tool may comprise one or more antennas that form part of transmitters, receivers, or both. A transmitting antenna employs alternating currents to generate an electromagnetic field, which can induce eddy currents in the surrounding conductive formation. The eddy currents can in turn generate a magnetic field that can be detected by a receiving antenna. The transmitting antenna can send out signals using different frequencies. The corresponding received signals may be characterized by phase and amplitude differences when spaced-apart receiving antennas are used. The measurements that can be made with respect to multi-frequency and multi-antenna spacing can reveal qualities of interest in the surrounding formation, with a sensitive range that is affected by the formation and the structure of the tool used to make the measurements.

As used in this document, in the formation coordination system, the "x-y plane" is parallel to the formation layers, and the "z axis" is perpendicular to the formation layers. "Horizontal resistivity" Rh is the resistivity in the x-y plane. "Vertical resistivity" Rv is the resistivity along the z axis. An electrically "isotropic formation" has substantially the same horizontal resistivity and vertical resistivity (Rh and Rv are within ±5% of each other), whereas "anisotropic formations" will have values for Rh and Rv that differ by at least ±5%. The "relative dip angle" is the angle between the tool vertical centerline (i.e., the "tool axis") and the normal to the formation x-y plane.

For the purposes of this document, "$d_1$" means the distance from a tool receiving antenna to the upper boundary of the reservoir. "$d_2$" means the distance from the same tool receiving antenna to the lower boundary of the reservoir. "$R_{S1}$" means the resistivity of the formation above the reservoir (above the upper boundary of the reservoir). "$R_{S2}$" means the resistivity of the formation below the reservoir (below the lower boundary of the reservoir). "$R_t$" means the resistivity of the reservoir itself.

Anisotropy, dip angle, and the distance to formation boundaries can have significant effects on the value of resistivity logging measurements. As a result, resistivity logging systems are more useful when they operate to account for formation anisotropy, dip angle, and boundary location—because the formation resistivity information obtained is usually more accurate.

In U.S. Pat. Nos. 6,163,155 and 7,659,722, as well as in United States Patent Publication Number 2010/0156424 (incorporated herein by reference in their entirety, and known collectively hereafter as the "Patents"), the structure of a directed logging tool and its respective data processing methods are introduced. To obtain increasingly accurate formation parameters, mathematical inversion is used, as a process of searching for ever more optimal matches between simulated data and actual measurements. In various embodiments, simulated data can be generated based on assumptions of formation parameters, include horizontal resistivity, vertical resistivity, dip angle, and the location of the formation boundary.

The acquired signal used as an input to the inversion process, along with the initial choice of formation model, affect the speed and accuracy of the result obtained. Thus, poor choices for input to the process can drive a complex inversion for a formation model into the trap of attempting to locally optimize the true inversion result. To avoid this situation, a signal picking method is presented herein for a robust inversion with directional LWD/MWD resistivity measurements. This methodology can be embedded in a logging tool to realize real-time acquired signal choice, using the best available measurement combination to provide more accurate resistivity measurements, and bed boundary detection.

As noted in the Patents, a directional resistivity tool may have N tilted or coaxial transmitter antennas $T_1$, $T_2$, $T_3$, ..., $T_N$ spaced along the tool (e.g., see tool apparatus 204 in FIG. 2). For the purposes of discussion, an illustrative logging tool may also have tilted or coaxial receiver antennas R1 and R2 that are axially spaced apart from the transmitter antennas and from each other. After the resistivity logging tool has been placed in a borehole and drilling commences, the tool begins to rotate while receiver measurements excited by multi-spacing and multi-frequency current source transmitters are acquired. 360-degree measurements may be obtained if the tool is rotated without changing its elevation in the borehole. Such measurements can be divided into 32 bins, such that each bin covers approximately 11-12 degrees (e.g., 11.25 degrees). Thus, the first bin (e.g., bin #1) may be used to collect measurements made in the upper-right hand direction, perpendicular to the longitudinal tool axis, and bin #17 may be used to collect measurements opposite (180 degrees opposite, in the borehole) to those collected in bin #1. Under real measurement conditions, correction for bin shift can be made by sinuous curve fitting over the 32 bins of data. Compensated measurements can then be calculated for the symmetric structure of the logging tool.

The measurements made at different frequencies and antenna spacings have different sensitivities to formation parameters, and therefore, different detection abilities—even with respect to the same parameter. Thus a suitable input signal combination can have a significant effect on the accuracy of inversion results. For this reason, among others, a signal choosing method is presented herein to provide a more accurate and efficient detection of formation resistivity, anisotropy, dip angle, and boundary position, using the measurements of resistivity logging tools with tilted antennas forming part of transmitters and/or receivers.

With a directed tool structure design, the frequency and spacing of the transmit/receive antennas may be varied as desired to change the depth of investigation, spatial resolution, and/or signal-to-noise ratio (SNR). In general, tools with greater spacing provide deeper measurements of bed boundary and shoulder resistivity, while tools with reduced spacing can provide more accurate information with respect to a localized area.

As shown in the tool apparatus 204 of FIG. 2, there can be three symmetric coaxial transmitters $T_1$-$T_1'$, $T_2$-$T_2'$ and $T_3$-$T_3'$ spaced along the tool 204 with e.g., approximately 16, 32 and 48 inch spacing to the center of two receivers R1 and R2, respectively. As used herein, a "transmitter" may include the electrical generation and drive circuitry that is used to generate and couple a signal to a transmitting antenna, and/or the transmitting antenna itself. Thus, a signal generator may be a transmitter, a power amplifier coupled to a transmitting antenna may be a transmitter, the transmitting antenna may be a transmitter, and the combination of the generator, amplifier, and the transmitting antenna may also be considered as a transmitter. Similarly, as used herein, a "receiver" may include the electrical reception and processing/demodulation circuitry that is coupled to a receiving antenna, and/or the receiving antenna itself. Thus, a demodulator may be a receiver, a preamplifier coupled to an antenna may be a receiver, the receiving antenna may be a receiver, and the combination of the demodulator, preamplifier, and the receiving antenna may also be considered to be a receiver.

The illustrated receiver antennas R1 and R2 are tilted with respect to the tool axis, and axially spaced apart from the transmitter antennas $T_1$-$T_1'$, $T_2$-$T_2'$ and $T_3$-$T_3'$ (collectively "transmitters") as noted previously, and from each other, e.g., with a 4 inch approximate spacing width. In addition, a receiver (with receiving antenna) R3 is located at a 64 inch distance from receiver R2.

The receiving antennas R1, R2, R3 (collectively "receivers") tilt approximately 45 degrees away the tool's longitudinal axis. Since tilted antennas are azimuthally sensitive, resistivity measurements are determined from the average compensated amplitude and phase measurement of the bin associated with the measurement in progress, possibly in combination with the average compensated measurements for nearby bins and other measured or estimated formation parameters, such as formation strike, dip, and anisotropy. Compensated measurements are determined by averaging measurements resulting from substantially symmetrically spaced transmitters. Compensated amplitude measurements $\alpha_c$ can be determined using the following equations (1)-(3), known to those of ordinary skill in the art:

$$\alpha_{T1} = \ln(A_{R1T1}) - \ln(A_{R2T1}) \quad (1)$$

$$\alpha_{T1'} = \ln(A_{R1T1'}) - \ln(A_{R2T1'}) \quad (2)$$

$$\alpha_c = (\alpha_{T1} + \alpha_{T1'})/2 \quad (3)$$

where $A_{R1T1}$ is the amplitude of the signal received by receiver R1 in response to transmitter T1, $A_{R1T1'}$ is the amplitude of the signal received by receiver R1 in response to transmitter T1', and so on. Compensated phase difference can be calculated using a similar method.

The average compensated amplitude and phase values from azimuthally spaced and axially spaced bins may also be included in resistivity calculations to account for the effects of anisotropic, dipping formations, as is known to those of ordinary skill in the art. The resistivity of the formation can then be calculated based on the absolute amplitude or phase measurements, or the averaged calculated values.

The geosignal (e.g., represented by the value $I_{R1T1}$ in equation (4) below) calculated for a selected bin can be used as a bed boundary indicator. In the Patents, a geosignal calculation function that is known to those of ordinary skill in the art is calculated, taking the difference between phase or log amplitude for the current bin, and the average phase or log amplitude for all bins at a given axial position in the borehole. This is shown in equation (4):

$$I_{R1T1} = \ln(A_{R1T1}(k)) - \frac{1}{n}\sum_{i=1,n} \ln(A_{R1T1}(i)) \quad (4)$$

where $A_{R1T1}(k)$ represents the bin values at the kth rotational position in the borehole. The geosignal phase can be calculated using a similar function, as is known to those of ordinary skill in the art.

In some embodiments, the compensated geosignal may be taken as the average of four geosignals provided by two receivers (e.g., two receiving antennas) excited by two symmetric transmitters (e.g., two transmitting antennas). In some embodiments, the geosignal is determined in other ways, including the difference between opposing bins, or the phase divided by the normalized average of the bins.

The resistivity log and bed boundary indicator may be displayed while logging and drilling operations progress, as a function of tool position and azimuthal orientation. This may enable increased accuracy with respect to steering the drill string during these operations.

In many embodiments, when spaced-apart transmitters and receivers are used to make the aforementioned measurements, (e.g., tools having approximately 16 inch, 32 inch, and 96 inch spacing between transmitters and receivers) resistivity values change dramatically when logging occurs near a formation boundary. After the boundary passes, the resistivity returns to values which are more representative of the current bed. The transmitter/receiver pairs having a wider spacing begin to measure the effect of the next layer earlier than transmitter/receiver pairs with narrower spacing, as the tool moves through the formation. However, the transmitter/receiver pairs having a wider spacing may also exhibit a higher noise level, with a reduced SNR.

When the tool is relatively far away from the boundary of the next layer in the formation, transmitter/receiver pairs with narrower spacing may not be sensitive enough to detect shoulder information. However, more accurate measurement values with respect to the current layer may be provided (than are available with the tool that has wider spacing).

To address some of the signal choice and inversion process issues mentioned previously, it is noted that an efficient inversion result can be obtained in many cases by carefully choosing only a portion of all measurements made. In this way, the size of the calculation memory used to invert formation parameters down hole can be reduced dramatically. In addition, by improving the choice of acquired signals, better inversion results can be realized, helping to avoid the substitution of local solutions for global optimization. Finally, inversion accuracy can often be improved by choosing measurements corresponding to higher SNR values.

In many embodiments, the characteristics of different tool antenna spacing configurations are known. By including formation information, such as local variables and shoulder layer parameters, a library can be built and used to guide the choice as to the best acquired signal to use for the inversion process.

For the purposes of this document, the "sensitive range" (SR) of a geosignal response is the vertical depth to the upper boundary where the geosignal response first rises to meet or exceed a selected minimum detectable value. That is, the SR can be used as a relative measure of the boundary effect on the response in multiple layer models. A received signal response that is less than the detectable value is treated as zero in the inversion application.

The SR can be set according to system requirements. For example, the minimum expected value of the geosignal, plus 2%. The SR can also be set as some fraction of the minimum expected geosignal value, such as 80% or 90% of the minimum expected value of the geosignal. The value for SR in a homogenous formation may be used to determine the sensitive range for the database 100, as seen in FIG. 1. Some other reference standard can also be used for the SR threshold. A larger value of SR is suitable for the detection of the far zone, and a smaller value of SR is more useful for detecting boundaries in the near zone. Other useful SR thresholds may be selected.

The SNR of a geosignal is defined herein as the ratio of the signal mean to the standard deviation of the signal in the sensitive range. The SNR provides a way to assess the relative quality of a selected signal. Using higher quality signals (e.g., signals with a higher SNR) can provide a more accurate result. Thus, the SNR can be calculated as follows:

$$SNR = \mu/\sigma, \text{ where } \mu = \frac{1}{N}\sum_{i=1}^{N} X_i \text{ and } \sigma = \sqrt{\frac{1}{N}\sum_{i=1}^{N}(X_i - \mu)^2} \quad (5)$$

where $X_i$ is the one of a total of N sample measurements obtained within the current sensitive range, and $X_1 > V_{min}$, where $V_{min}$ is the minimum detectable value (e.g., selected to be the minimum expected value of the geosignal, plus 2%. The SR can also be set as some fraction of the minimum expected geosignal value, such as 80% or 90% of the minimum expected value of the geosignal). A similar evaluation could be applied to the resistivity signal. However, instead of dropping to zero, the resistivity response will be closer to the true resistivity when there is no shoulder effect. Thus, in some embodiments, the minimum detectable value of resistivity can be selected as ±2% of the true resistivity value.

Figure 5:
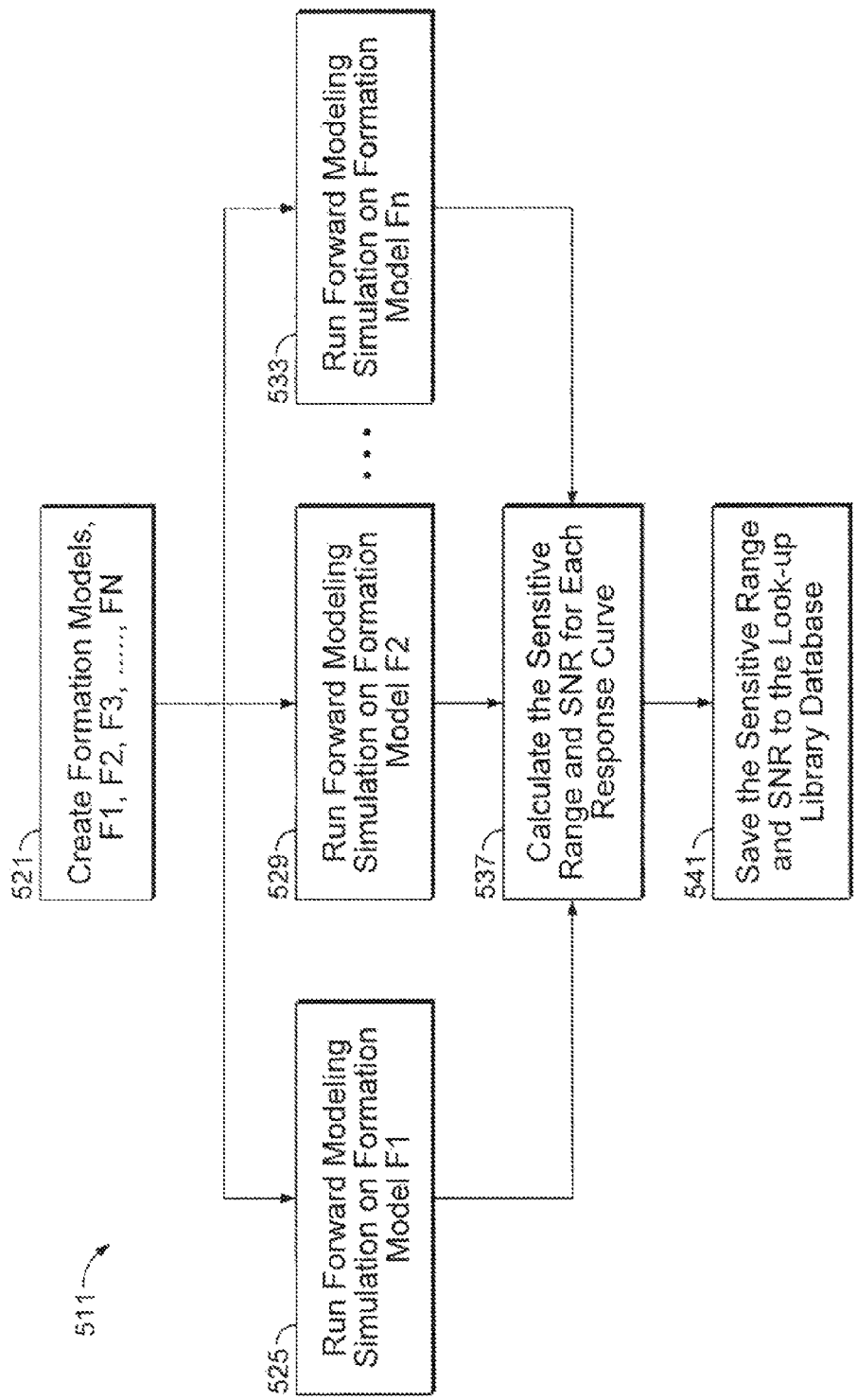
FIG. 5 is a flow chart illustrating several methods according to various embodiments of the invention.

The library mentioned previously can be established as a look-up table (e.g., see database 100 in FIG. 1) that is used to save the SNR and the sensitive range for various measurements obtained with respect to different formation parameters. The sensitive range and SNR are based on simulating forward modeling responses for each formation model. A specific formation model is defined by its upper layer resistivity $R_{S1}$, middle layer resistivity $R_t$, lower layer resistivity $R_{S2}$, drilling dipping angle, and the middle bed thickness H. The process of building the library is shown in FIG. 5, and will be described below.

FIG. 1 illustrates a database 100 of reservoir models used within formations 110, 114 having different characteristics according to various embodiments of the invention. The database 100 can take the form of a look-up table, as noted previously. For each formation 110, 114, the response associated with a selected transmitter/receiver antenna spacing along the tool, and excitation frequency are shown. These are shown to correspond with a particular sensitive range and SNR, according to a two layer or three layer formation model. For example, response 118 represents one of six response curves associated with the two formations 110, 114. Here, formation 110 is characterized by 10-50-10 ohm·m layers, and formation 114 is characterized by 1-20-1 ohm·m layers.

As shown in FIG. 1, the database 100 makes use of geosignal amplitude as a boundary indicator. Two layer and three layer portions for each formation model are listed. The SR and SNR of the two layer portion indicate the maximum range for detection of a boundary layer, given the tool characteristics. The three layer portion illustrates the effect of the nearest formation boundary. It should be noted that only two formations 110, 114 are shown in the figure for reasons of clarity. A library/database 100 built for use in an actual LWD operation might list thousands of models and/or formations 110, 114.

To further explain the makeup of the database 100, the reader is encouraged to review the various responses shown. For example, the SR for the two layer model of the formation 114 using a 96 inch transmitter/receiver spacing and a frequency of 500 kHz is 11.7 feet (assuming the +2% threshold described previously). This means the tool will not receive a signal with an acceptable SNR at a distance of greater than 11.7 feet from the nearest boundary layer. As a matter of contrast, the SR for the three layer model using the same transmitter/receiver spacing and excitation frequency is 8.98 ft, which means the response is affected by two boundaries and is reduced to a level which is effectively treated as "zero" at a distance of about 9 feet from the nearest boundary. Finally, since the SR of a transmitter/receiver pair having a spacing of 16 inches at a frequency of 500 kHz has the same SR and SNR in both the two and three layer models, one of ordinary skill in the art will realize that there is essentially no effect from the lower layer. Thus, when the formation model is assumed to have a distance of 2.1 feet to the upper boundary, with a 20 foot thickness of the middle layer, and two curves are used for the inversion model, the best combination of spacing and frequency to use for measurement is a combination of the 96 and 16 inch spacing with 500 kHz excitation frequency because the SR of the three layer portion for 16 inch spacing at 500 kHz frequency will accommodate the expected distance to the boundary, and the SR of the two layer portion for 96 in 500 k is large enough to accommodate an additional boundary located further away.

It should be noted that different inversion calculations use different numbers of response curves as input. SR is the first selection factor for the curves to use as input to inversion. If more than the needed number of curves is found in the table for the data that has been acquired, then SNR will be used as a secondary selection factor. Thus, the number of selection factors depends on the number of available curves in a given formation model, and the number of curves used in the inversion algorithm. In the immediately previous example, two curves are used.

When a library is built according to the principles described herein, each formation model might be constructed with a 2 to N layer structure. In the case of FIG. 1, the following parameters were used to build the library, including both two and three layer models for each formation 110, 114:
resistivity of the reservoir layer (ohm·m): about 1 to about 100;
dip angle=0 to 90 degrees;
resistivity ratio between the layers=about 0.05 to about 1; and
reservoir layer thickness for the three layer model=about 5 feet to about 30 feet.

The acquired signals chosen for use with the inversion process depend on the formation characteristics. Before a signal is chosen using the library, inverted parameters should be excluded from the formation model. Initial values of parameters can be guessed, or obtained via measurement, or by using other tools. Once the formation information is complete, the best signal combination is found by searching the table. The signal chosen in this manner is then used in the inversion calculation process.

For example, when the two boundary distances are inverted items, the formation resistivity and dip angle are entered with fixed values. Initial guesses of two boundary distances may be set with values obtained from an off-site well. Two or more signals are chosen for the two boundaries, having a relatively high SNR, a suitable depth of investigation, and sensitivity to the inverted table elements.

For example, if the offset log information provides estimated data that leads to the choice of the 10-50-10 model 110 in FIG. 1, and the acquired input data indicates a measured bed boundary distance of about five feet, then various embodiments would operate to select the response 118, because the 32 in/2 MHz combination provides a higher SNR (e.g., 0.14) than the 96 in/2 MHz combination. Thus, measurements provided by the 32 in/2 MHz combination of transmitters/receivers would be used at this point as input data to the inversion process, to solve for the formation resistivity parameters.

FIG. 2 is a block diagram of apparatus 200 according to various embodiments of the invention. In many embodiments, the apparatus 200 comprises a combination of down hole transmitters and receivers, such as transmitters $T_1$-$T_1'$, $T_2$-$T_2'$ and $T_3$-$T_3'$, and receivers R1, R2, and R3. As shown in FIG. 2, the down hole transmitters $T_1$-$T_1'$, $T_2$-$T_2'$ and $T_3$-$T_3'$ may represent antennas that transmit electromagnetic signals, and the down hole receivers R1, R2, and R3 may represent antennas that receive electromagnetic signals. Greater or fewer numbers of transmitters $T_1$-$T_1'$, $T_2$-$T_2'$ and $T_3$-$T_3'$ and receivers R1, R2, and R3 may be used in various embodiments.

A variety of antenna configurations may be applied to the down hole tool apparatus 204, perhaps taking the form of an electromagnetic resistivity logging tool. In some cases, the transmitters $T_1$-$T_1'$, $T_2$-$T_2'$ and $T_3$-$T_3'$, and/or receivers R1, R2, and R3 have one or more antenna coils tilted at some angle to the longitudinal axis of the tool apparatus 204. The transmitters $T_1$-$T_1'$, $T_2$-$T_2'$ and $T_3$-$T_3'$, and/or receivers R1, R2, and R3 may be located symmetrically, with equal numbers of units disposed on each side of some arbitrary location along the longitudinal axis of the tool body, or in an asymmetric fashion (shown in FIG. 2). Transmitters $T_1$-$T_1'$, $T_2$-$T_2'$ and $T_3$-$T_3'$, and/or receivers R1, R2, and R3 may be parallel or perpendicular to each other, and may or may not be co-located. The location of the transmitters $T_1$-$T_1'$, $T_2$-$T_2'$ and $T_3$-$T_3'$, and/or receivers R1, R2, and R3 (e.g., the antennas included in them) may be varied to suit the desired depth of investigation.

The apparatus 200 may further include one or more processors 230 to repeatedly solve for boundary distance and resistivity formation parameters (e.g., $d_1$, $d_2$, $R_{S1}$, $R_{S2}$, etc.) using a chosen model and input data comprising actual data acquired by the combination of transmitters $T_1$-$T_1'$, $T_2$-$T_2'$ and $T_3$-$T_3'$, and receivers R1, R2, and R3, along with a valid sensitive range and the highest SNR found in the database for the chosen model.

As noted previously, and will be described in further detail below, the chosen model is selected from a plurality of down hole tool response models in a formation model database 258 using initial estimated data that includes at least formation resistivity parameters. The combination of transmitters $T_1$-$T_1'$, $T_2$-$T_2'$ and $T_3$-$T_3'$, and receivers R1, R2, and R3 are referenced in the database 258, and the processor(s) 230 can be used to update the chosen model with the boundary distance and resistivity formation parameters that are determined using the inversion process. The database 258 may be similar to or identical to the database 100 of FIG. 1.

A memory can be coupled to the processor(s) to store the database. Thus, the apparatus 200 may further comprise a memory 250 to store the database 258, the memory 250 being electrically coupled to the processor(s) 230. While not shown in FIG. 2, it should be noted that the memory 250 may be located down hole, or above the surface 266.

The database may include dip angles. Thus, the database 258 may comprise multiple dip angles for the combination of transmitters $T_1$-$T_1'$, $T_2$-$T_2'$ and $T_3$-$T_3'$, and receivers R1, R2, and R3.

The apparatus 200 may also include logic 240, perhaps comprising a programmable drive and/or sampling control system. The logic 240 can be used to acquire formation data, such as resistivity.

A data transmitter can be used to communicate solutions to the surface for further processing. Thus, the apparatus 200 may further comprise a data transmitter 244 (e.g., a telemetry transmitter or transceiver) to transmit the boundary distance and resistivity formation parameters to a surface data processing system 256.

The combination of electromagnetic transmitters and receivers may include two or more or each component, with antenna response patterns that are coaxial or non-coaxial. Thus, the apparatus 200 may include a combination of transmitters $T_1$-$T_1'$, $T_2$-$T_2'$ and $T_3$-$T_3'$, and receivers R1, R2, and R3 that comprise two or more transmitters and receivers, at least one of the transmitters or the receivers comprising an antenna having a response direction that is not coaxial with antennas included in other ones of the transmitters and the receivers.

The antennas of the receivers may be spaced apart from the antennas in the transmitters in various ways. Thus, the apparatus 200 may comprise transmitters $T_1$-$T_1'$, $T_2$-$T_2'$ and $T_3$-$T_3'$, and receivers R1, R2, and R3 wherein at least a first one of antennas included in the receivers is about two to about six times the distance from an antenna included in one of the transmitters, as a second one of the antennas included in the receivers.

Figure 3:
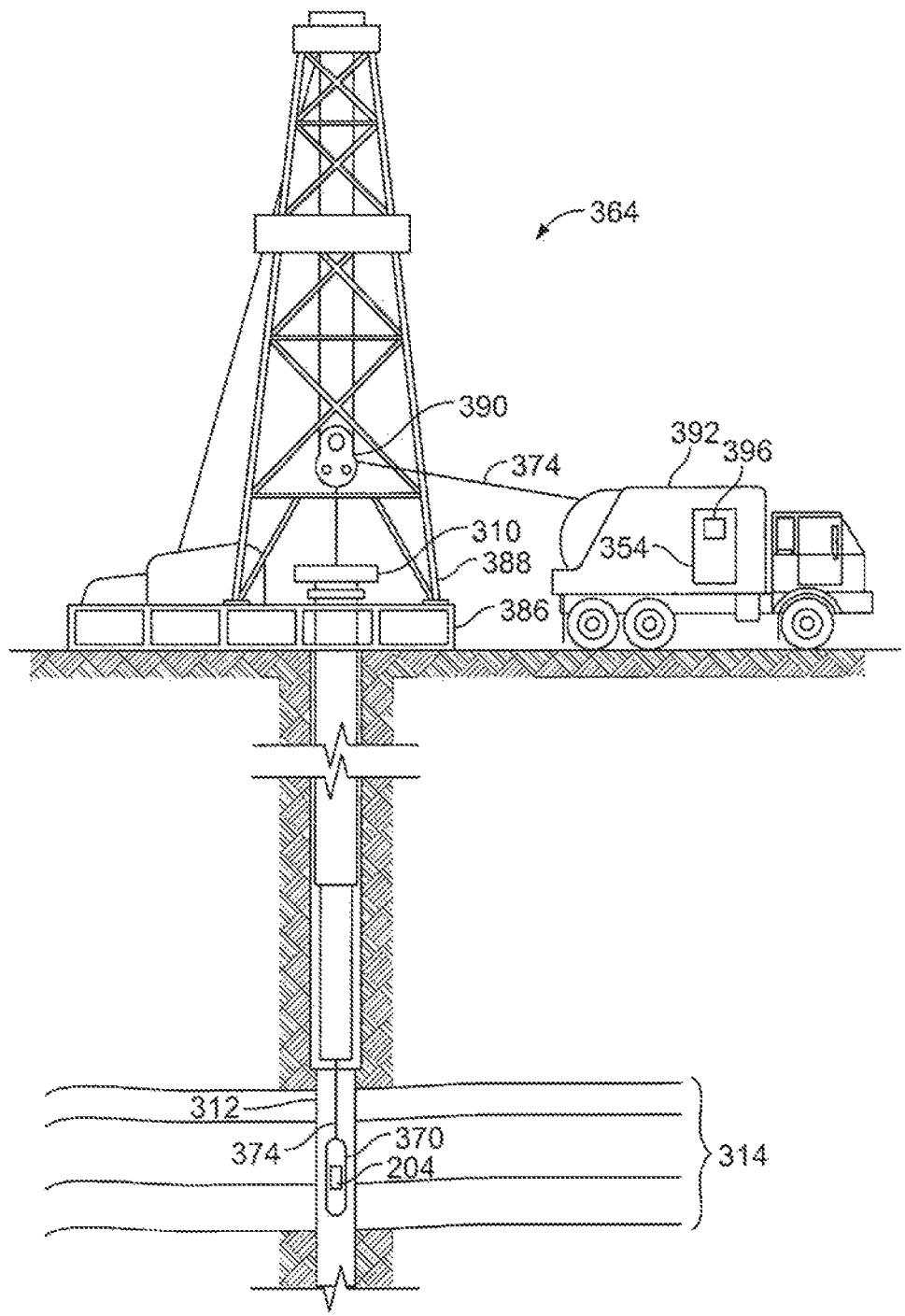
FIG. 3 illustrates a wireline system embodiment of the invention.
Figure 4:
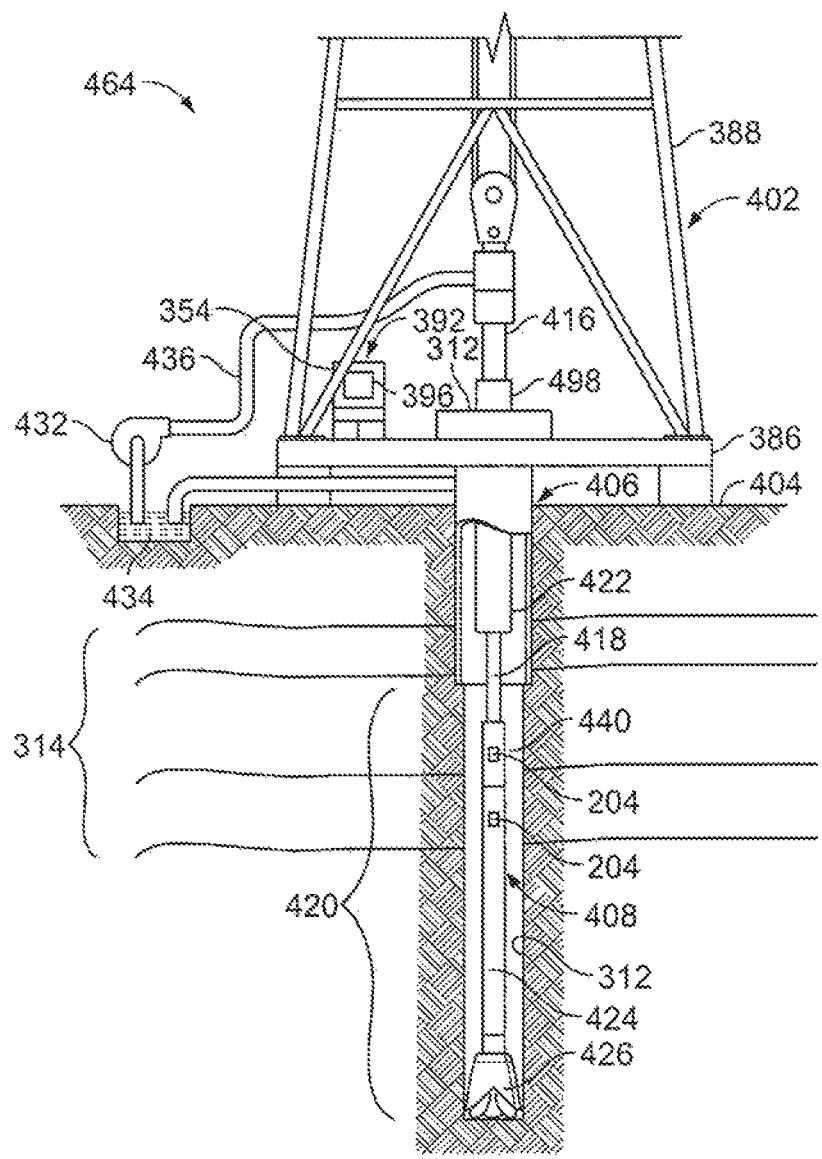
FIG. 4 illustrates a drilling rig system embodiment of the invention.

FIG. 3 illustrates a wireline system 364 embodiment of the invention, and FIG. 4 illustrates a drilling rig system 464 embodiment of the invention. Thus, the systems 364, 464 may comprise portions of a tool body 370 as part of a wireline logging operation, or of a down hole tool 424 as part of a down hole drilling operation. FIG. 3 shows a well during wireline logging operations. A drilling platform 386 is equipped with a derrick 388 that supports a hoist 390.

Drilling of oil and gas wells is commonly carried out using a string of drill pipes connected together so as to form a drilling string that is lowered through a rotary table 310 into a wellbore or borehole 312. Here it is assumed that the drilling string has been temporarily removed from the borehole 312 to allow a wireline logging tool body 370, such as a probe or sonde, to be lowered by wireline or logging cable 374 into the borehole 312. Typically, the tool body 370 is lowered to the bottom of the region of interest and subsequently pulled upward at a substantially constant speed.

During the upward trip, at a series of depths the instruments (e.g., the transmitters $T_1$-$T_1'$, $T_2$-$T_2'$ and $T_3$-$T_3'$, and receivers R1, R2, and R3 shown in FIG. 2) included in the tool body 370 may be used to perform measurements on the subsurface geological formations 314 adjacent the borehole 312 (and the tool body 370). The measurement data can be communicated to a surface logging facility 392 for storage, processing, and analysis. The logging facility 392 may be provided with electronic equipment for various types of signal processing, which may be implemented by any one or more of the components of the apparatus 200 in FIG. 2. Similar formation evaluation data may be gathered and analyzed during drilling operations (e.g., during LWD operations, and by extension, sampling while drilling).

In some embodiments, the tool body 370 comprises a formation resistivity tool for obtaining and analyzing resistivity measurements from a subterranean formation through a wellbore. The formation resistivity tool is suspended in the wellbore by a wireline cable 374 that connects the tool to a surface control unit (e.g., comprising a workstation 354). The formation resistivity tool may be deployed in the wellbore on coiled tubing, jointed drill pipe, hard wired drill pipe, or any other suitable deployment technique.

Turning now to FIG. 4, it can be seen how a system 464 may also form a portion of a drilling rig 402 located at the surface 404 of a well 406. The drilling rig 402 may provide support for a drill string 408. The drill string 408 may operate to penetrate a rotary table 310 for drilling a borehole 312 through subsurface formations 314. The drill string 408 may include a Kelly 416, drill pipe 418, and a bottom hole assembly 420, perhaps located at the lower portion of the drill pipe 418.

The bottom hole assembly 420 may include drill collars 422, a down hole tool 424, and a drill bit 426. The drill bit 426 may operate to create a borehole 312 by penetrating the surface 404 and subsurface formations 314. The down hole tool 424 may comprise any of a number of different types of tools including MWD (measurement while drilling) tools, LWD tools, and others.

During drilling operations, the drill string 408 (perhaps including the Kelly 416, the drill pipe 418, and the bottom hole assembly 420) may be rotated by the rotary table 310. In addition to, or alternatively, the bottom hole assembly 420 may also be rotated by a motor (e.g., a mud motor) that is located down hole. The drill collars 422 may be used to add weight to the drill bit 426. The drill collars 422 may also operate to stiffen the bottom hole assembly 420, allowing the bottom hole assembly 420 to transfer the added weight to the drill bit 426, and in turn, to assist the drill bit 426 in penetrating the surface 404 and subsurface formations 314.

During drilling operations, a mud pump 432 may pump drilling fluid (sometimes known by those of skill in the art as "drilling mud") from a mud pit 434 through a hose 436 into the drill pipe 418 and down to the drill bit 426. The drilling fluid can flow out from the drill bit 426 and be returned to the surface 404 through an annular area 440 between the drill pipe 418 and the sides of the borehole 312. The drilling fluid may then be returned to the mud pit 434, where such fluid is filtered. In some embodiments, the drilling fluid can be used to cool the drill bit 426, as well as to provide lubrication for the drill bit 426 during drilling operations. Additionally, the drilling fluid may be used to remove subsurface formation 314 cuttings created by operating the drill bit 426.

Thus, referring now to FIGS. 2-4, it may be seen that in some embodiments, the systems 364, 464 may include a drill collar 422, a down hole tool 424, and/or a wireline logging tool body 370 to house one or more apparatus 204, similar to or identical to the apparatus 204 described above and illustrated in FIG. 2. Thus, for the purposes of this document, the term "housing" may include any one or more of a drill collar 422, a down hole tool apparatus 204, 424, and a wireline logging tool body 370 (all having an outer wall, to enclose or attach to instrumentation, sensors, fluid sampling devices, pressure measurement devices, transmitters, receivers, and data acquisition systems). The apparatus 204 may comprise a down hole tool, such as an LWD tool or MWD tool. The tool body 370 may comprise a wireline logging tool, including a probe or sonde, for example, coupled to a logging cable 374. Many embodiments may thus be realized.

For example, in some embodiments, a system 364, 464 may include a display 396 to present resistivity information, both measured and predicted, as well as database information, perhaps in graphic form. A system 364, 464 may also include computation logic, perhaps as part of a surface logging facility 392, or a computer workstation 354, to receive signals from transmitters and receivers, and other instrumentation to determine the distance to boundaries in the formation 314.

Thus, a system 364, 464 may comprise a down hole tool 424, and an apparatus 204 attached to the down hole tool 424, the apparatus 204 to be constructed and operated as described previously. In some embodiments, the down hole tool 424 comprises one of a wireline tool or an MWD tool.

The apparatus 200, 204; processors 230; logic 240; data transmitter 244; database 258; data processing system 256; rotary table 310; borehole 312; computer workstations 354; systems 364, 464; tool body 370; logging cable 374; drilling platform 386; derrick 388; hoist 390; logging facility 392; display 396; surface 404; drill string 408; Kelly 416; drill pipe 418; bottom hole assembly 420; drill collars 422; down hole tool 424; drill bit 426; mud pump 432; mud pit 434; hose 436; annular area 440; receivers R1, R2, and R3; and transmitters $T_1$-$T_1'$, $T_2$-$T_2'$ and $T_3$-$T_3'$ may all be characterized as "modules" herein. Such modules may include hardware circuitry, and/or a processor and/or memory circuits, software program modules and objects, and/or firmware, and combinations thereof, as desired by the architect of the apparatus 200, 204 and systems 364, 464 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 200, 204 and systems 364, 464 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

For example, FIG. 5 is a flow chart illustrating several methods 511 according to various embodiments of the invention. The method 511 may begin at block 521, where formation models are created, using various configurations of transmitter/receiver combinations, resistivity, dip angle, and reservoir thickness H.

At blocks 525, 529, 533, the method 511 may comprise running a forward simulation on the model configurations to provide a tool response curve for each reservoir model and combination of transmitters and receivers.

At block 537, the method 511 may include calculating the sensitive range and SNR for each response curve.

At block 541, the sensitive ranges and SNR are saved in the database, perhaps to be accessed as a lookup table in a data library. Additional embodiments may be realized.

Figure 6:
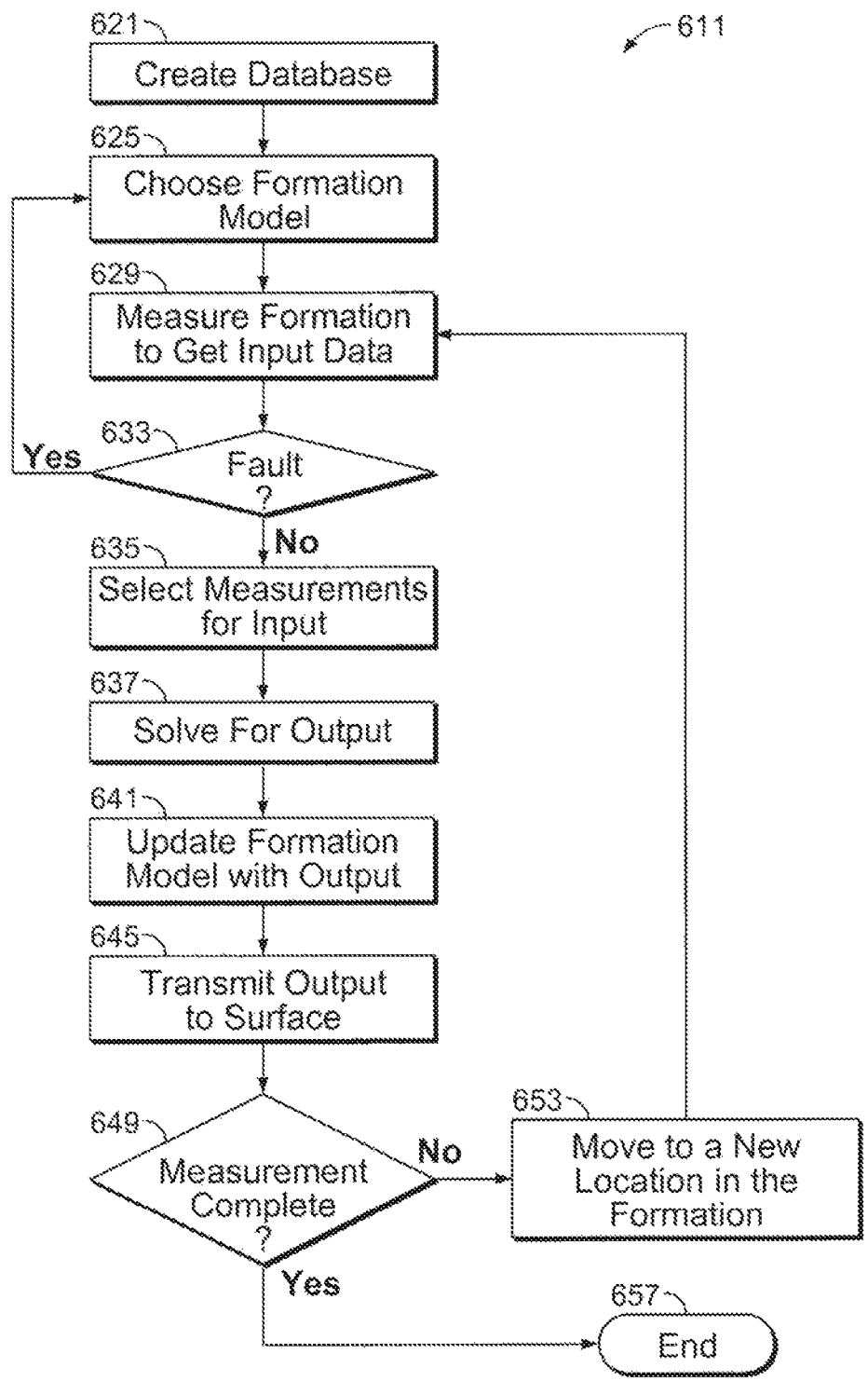
FIG. 6 is a flow chart illustrating several additional methods according to various embodiments of the invention.

For example, FIG. 6 is a flow chart illustrating several additional methods 611 according to various embodiments of the invention. The methods 611 may begin with choosing a model from the model database using estimated data. Estimated values may be obtained from offset well log data, for example.

At this point, the chosen model can be used repeatedly to solve for formation parameters (e.g., $R_{S1}$, $R_{S2}$, $R_t$, $d_1$, and $d_2$) at the location of each new data acquisition point (e.g., where resistivity is measured) in the formation. The inversion solution is obtained the first time by using a database model chosen using the estimated parameters (e.g., obtained from the offset well log) and the newly-acquired data.

Thereafter, subsequent inversion solutions are obtained by using information provided by the immediately prior inversion solution, along with newly-acquired data, which is fed into the model and inverted. For example, the input provided by the combination of transmitter and receivers can be signal phase, signal attenuation, the geosignal, etc. The output of the inversion operation can be formation information, such as $d_1$, $d_2$, $R_{S1}$, $R_{S2}$, $R_t$, and dip angle. Finally, the chosen model is updated with information taken from the newly-obtained solution, so that the updated model can be used with the next set of acquired data.

In some embodiments, a method 611 may begin at block 621 with creating the database of formation models. The database may include many different parameters, including: multiple transmitter-receiver antenna spacings, dip angle, transmitter frequency, reservoir height, and sensitive range/SNR for each of the spacings. Thus, the activity at block 621 may comprise creating the formation model database for a combination of down hole transmitters and receivers, the database including at least multiple transmitter-receiver antenna spacings, and a boundary distance valid sensitive range and SNR for each of the spacings.

The database can be created by modeling transmitter-receiver antenna spacing combinations in the tool. Thus, the activity at block 621 may include modeling responses of the combinations of down hole transmitters and receivers in a the formation.

The response of various transmitter-receiver combinations may be modeled over a plurality of frequencies. Thus, the activity at block 621 may comprise modeling responses of the combinations of transmitters and receivers in the formation with respect to multiple frequencies.

The boundary distance valid sensitive range may be established by setting a threshold detectable value as a fraction of the value of the resistivity signal (e.g., 2% above or below the resistivity amplitude). Thus, the sensitive range may correspond to a threshold minimum detectable value in a homogenous formation.

The SNR may comprise the ratio of mean to standard deviation of a signal, such as a geosignal. Thus, the SNR may comprise a ratio of a mean of a signal and a standard deviation of the signal, within the valid sensitive range.

The method 611 may continue on to block 625 with choosing a chosen model from a plurality of down hole tool response models in a formation model database, using initial estimated data that includes at least formation resistivity parameters (e.g., $R_{S1}$, $R_{S2}$, $R_t$).

A well log can be used to provide initial estimated data, such as distance/resistivity formation parameters. Thus, the activity at block 625 may comprise determining the estimated data, to include distance and resistivity formation parameters (e.g., $d_1$, $d_2$, $R_{S1}$, $R_{S2}$, $R_t$), as a result of a well logging operation.

The method 611 may continue on to block 629 with making measurements in the formation to acquire input data for the inversion process, to determine properties of the formation, including the distance to the bed boundary, bed thickness, resistivities, and dip angle. For example, resistivity measurements that yield values for $R_{S1}$, $R_{S2}$, $R_t$ may be made. Geosignal measurements of the specific formation are attained and used to calculate the distance to the bed boundary, designated as $d_1$ and $d_2$.

If a geological discontinuity, such as a fault, is encountered during actual data acquisition, a new solution process can be initiated. Thus, when a geological discontinuity is encountered in the formation, as determined at block 633, the method 611 may comprise returning to block 625, to include the activity of initiating a new solution process—by acquiring new input data to choose a new model from the plurality of models in the database.

If no discontinuities are encountered at block 633, the method 611 may continue on to block 635 with selecting the measurements from those that have been made for use as input to the solution mechanism, such as an inversion algorithm. These measurements may be selected by using the formation model database, according to the sensitive range and SNR within the chosen formation model, as described previously.

The method 611 may then continue on to block 637 with repeatedly solving for boundary distance and resistivity formation parameters using the chosen model and input data comprising actual data acquired by a combination of down hole transmitters and receivers that are referenced in the database, along with a valid sensitive range and the greatest SNR for the chosen model.

The database may be accessed as a look-up table. Thus, the activity at block 637 may comprise accessing values in the formation model database, configured to be referenced as a look-up table.

Mathematical inversion may be used as part of the solution process. Thus, the activity at block 637 may comprise mathematical inversion of the chosen model, with the actual acquired data as input, and the boundary distance and resistivity formation parameters as output.

The method 611 may continue on to block 641 with updating the chosen model with the boundary distance and resistivity formation parameters.

The boundary distance may include distances from one or more reference points on a down hole tool attached to various transmitters and receivers (e.g., the locations of one or more antennas coupled to the transmitters or receivers, or some arbitrary point on the tool), to a boundary between formation layers. The resistivity formation parameters may include two or more resistivity values, depending on whether a two or three-layer model is used. Thus, the boundary distance and resistivity formation parameters may comprise one or more distances between a reference point on the tool and a boundary of the formation, and one or more resistivity combinations comprising resistivity values on either side of the boundary.

The distance and resistivity formation parameters provided by the inversion solution can be transmitted to the surface to guide drilling operations. Thus, the method 611 may continue on to block 645 with sending at least some of the distance and resistivity formation parameters to a surface processor to steer a bit drilling in the formation.

If the measurement process in the formation is complete, as determined at block 649, the method 611 may end at block 657. Otherwise, the method 611 may include, at block 653, moving the measurement transmitters and/or receivers to a new location in the reservoir/formation, and taking additional measurements at block 629. Additional embodiments may be realized.

For example, in some cases a large database is built up with various formation models. This can be accomplished with taking real measurements of real formation values.

The next part of the process involves creating a formation model database for a selected combination of transmitters/receivers, the database including transmitter-receiver spacing, dip angle, transmitter frequency, reservoir height, and sensitive range/SNR for each spacing.

To begin the solution process, a formation model can be chosen from the database using information obtained from an offset well, or with the assistance of other instruments. Since the instrument transmitter/receiver spacing is known, as well as the frequency, the best response combination for the instrument can be found within the chosen formation model by finding a valid sensitive range, and then by finding the greatest SNR response in the chosen model.

The inversion process makes use of actual measurements as input to determine the unknown formation parameters. However, the number of input data should be reduced as much as possible, because if the amount of input to the inversion code is large, the calculation time will be long, preventing fast estimates of formation information on-site.

The database represents an analysis of all the possible responses for each formation model. Parameters of the chosen formation model are therefore used to calculate the properties of various responses. Since the formation parameters that will be inverted in the future are known, the input data for inversion can be chosen as a portion of all available measurements.

Based on the valid sensitive range (first) and the greatest SNR (second), data are chosen for input into the inversion algorithm. For example, if it is determined that a transmitter/receiver combination operating at a distance of 16 in/2 MHz provides results in a valid sensitive range, and the greatest SNR at the current inversion point, the actual measurements of the 16 in/2 MHz combination will be used as input to accomplish the inversion. The input provided by the combination can be signal phase, signal attenuation, the geosignal, etc. The output of the inversion operation can be formation information, such as $d_1$, $d_2$, $R_{S1}$, $R_{S2}$, $R_t$, and dip angle.

Once the acquired measurement signals are chosen for input to the inversion process, the inversion process is initiated. Inversion can be used to solve for real distance and resistivity formation parameters (e.g., $d_1$, $d_2$, $R_{S1}$, $R_{S2}$, $R_t$, and dip angle). The results of the inversion process can then be used in several ways. These include: updating parameters of the formation model, as information for choosing input measurements into the inversion algorithm, as information to help choose a formation model for the next data logging point, and (e.g., transmitted to the surface) to help steer the bit as part of the drilling process.

At this point, the tool can be moved to a new position in the formation to obtain new measurements. The activity of the preceding three paragraphs can be repeated as needed, until all measurements are completed and processed.

It should be noted that the methods described herein do not have to be executed in the order described, or in any particular order. Moreover, various activities described with respect to the methods identified herein can be executed in iterative, serial, or parallel fashion. The various elements of each method can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
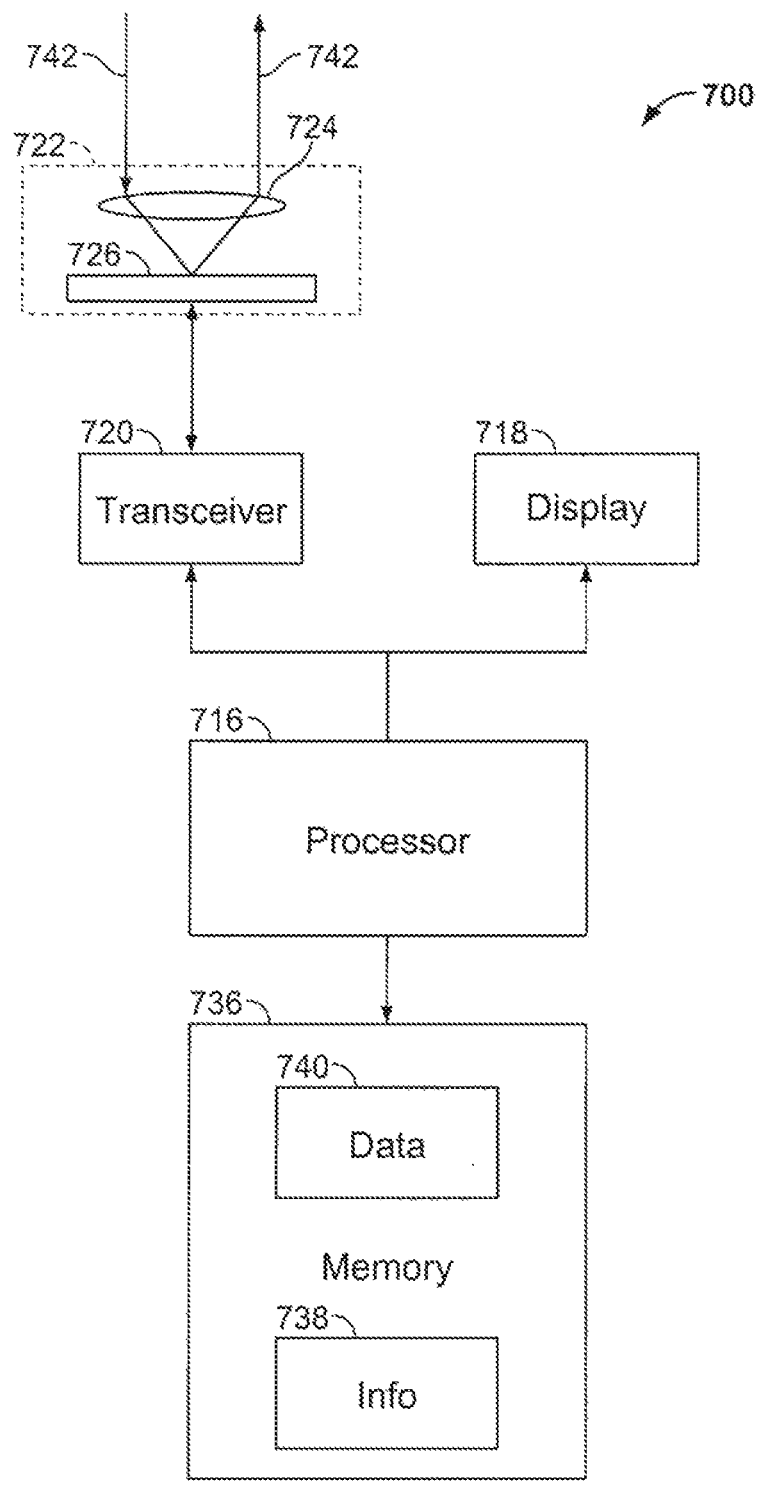
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor) having associated information 738 (e.g., computer program instructions and/or data), which when executed by one or more of the processors 716, results in a machine (e.g., the article 700) performing any actions described with respect to the database of FIG. 1, the apparatus of FIG. 2, the systems of FIGS. 3 and 4, or the methods of FIGS. 5 and 6.

In some embodiments, the article 700 may comprise one or more processors 716 coupled to a display 718 to display data processed by the processor 716 and/or a wireless transceiver 720 (e.g., a down hole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716.

In various embodiments, the article 700 may comprise communication apparatus 722, which may in turn include amplifiers 726 (e.g., preamplifiers or power amplifiers) and one or more antenna 724 (e.g., transmitting antennas and/or receiving antennas). Signals 742 received or transmitted by the communication apparatus 722 may be processed according to the methods described herein.

Many variations of the article 700 are possible. For example, in various embodiments, the article 700 may comprise a down hole tool, such as the tool apparatus 204 shown in FIG. 2. In some embodiments, the article 700 is similar to or identical to the apparatus 200 shown in FIG. 2.

Using the apparatus, systems, and methods disclosed herein may provide a more accurate determination of boundary locations within a reservoir, by repeatedly acquiring data, solving for unknown formation parameters, and revising an associated database with the results of the solution. In addition, processing information down hole permits the transmission of fewer parameters to the surface, providing a more efficient use of available bandwidth. The combination of these advantages can significantly reduce risk to the operation/exploration company while at the same time controlling time-related costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a bottom hole assembly that is part of a drill string, the bottom hole assembly comprising,
a down hole tool comprising at least one antenna pair to determine resistivity data during rotation of the down hole tool; and
an apparatus attached to the down hole tool, the apparatus comprising,
a machine-readable medium to store a formation model database comprising multiple formation models; and
a processor to execute program code to cause the apparatus to,
receive the resistivity data during down hole operation of the down hole tool;
solve for at least resistivity formation parameters using a selected one of the formation models and a selected portion of the received resistivity data; and
update the selected formation model based, at least in part, on the resistivity formation parameters.

2. The system of claim 1, wherein the formation model database includes formation response entries that each associates a formation model with a signal-to-noise ratio (SNR), wherein each formation response entry further associates a formation model with a response sensitive range, said processor to execute the program code to cause the apparatus to:
select a portion of the received resistivity data based on a valid sensitive range of a formation boundary distance and a greatest SNR; and
perform mathematical inversion to solve for at least resistivity formation parameters using the selected formation model and the selected portion of the received resistivity data.

3. The system of claim 2, wherein said processor is to execute the program code to cause the apparatus to update the selected formation model with the resistivity formation parameters.

4. The system of claim 2, wherein the down hole tool includes a transmitter that is to transmit boundary distance and resistivity formation parameters to a surface data processing system during the down hole operation.

5. The system of claim 1, further comprising a display to display the resistivity formation parameters during the down hole operation.

6. The system of claim 1, wherein the resistivity data determined by the at least one antenna pair comprises compensated resistivity data.

7. The system of claim 1, wherein the processor is to execute the program code to cause the apparatus to select the selected one of the formation models based, at least in part, on initial estimated data that includes initial values for the resistivity formation parameters.

8. The system of claim 1, wherein the processor is to execute the program code to cause the apparatus to select the selected one of the formation models based, at least in part, on a valid sensitive range of a formation boundary distance and a greatest signal-to-noise ratio (SNR), wherein the valid sensitive range is adjusted based, at least in part, on real-time formation conditions.

9. The system of claim 1, wherein the formation model database includes formation response entries, wherein each formation response entry associates a formation model of the multiple formation models with a signal-to-noise ratio (SNR).

10. A method comprising:
generating a formation model database comprising multiple formation models;
rotating a down hole assembly that includes a down hole tool comprising at least one antenna pair that determines resistivity data;
determining the resistivity data using the at least one antenna pair during rotation of the down hole assembly as part of a down hole operation; and
during the down hole operation,
receiving the resistivity data;
solving for at least resistivity formation parameters using a selected one of the formation models and a selected portion of the received resistivity data; and
updating the selected formation model based, at least in part, on the resistivity formation parameters.

11. The method of claim 10, wherein generating the formation model database includes entering, within the formation model database, formation response entries that each associates a formation model with a respective signal-to-noise ratio (SNR).

12. The method of claim 11, wherein each of the formation response entries further associates a formation model with a response sensitive range, said method further comprising:
selecting a portion of the received resistivity data based on a valid sensitive range of a formation boundary distance and a greatest SNR; and
performing mathematical inversion to solve for at least resistivity formation parameters using the selected formation model and the selected portion of the received resistivity data.

13. The method of claim 12, further comprising updating the selected formation model with the resistivity formation parameters.

14. The method of claim 12, further comprising transmitting boundary distance and resistivity formation parameters to a surface data processing system during down hole operation.

15. The method of claim 10, further displaying on a display device resistivity formation parameter data during the done hole operation.

16. An apparatus comprising:
a down hole logging tool to be lowered into a borehole during down hole resistivity measurement operations, the down hole logging tool comprising,
a combination of transmitters and receivers that are to measure resistivity data during the down hole resistivity measurement operations, wherein the transmitters and receivers form axially spaced transmitter receiver pairs;
a machine-readable medium to store a database of formation models, wherein the database includes formation response entries, wherein each formation response entry associates a formation model with a respective sensitive range and signal-to-noise ratio (SNR); and
a processor to execute program code to cause the processor, during the down hole resistivity measurement operations, to,
receive the resistivity data; and
repeatedly solve for boundary distance and resistivity values using the received resistivity data and a selected one of the formation models.

17. The apparatus of claim 16, wherein each formation response entry further associates a formation model with a response sensitive range, wherein said processor is to execute the program code to cause the processor to:
select a portion of the received resistivity data based on a valid sensitive range of a formation boundary distance and a greatest SNR; and
perform mathematical inversion to solve for at least resistivity formation parameters using the selected formation model and the selected portion of the received resistivity data.

18. The apparatus of claim 17, wherein said processor is to execute the program code to cause the processor to update the selected formation model with the resistivity formation parameters.

19. The apparatus of claim 17, wherein the down hole logging tool comprises a transmitter to transmit boundary distance and resistivity formation parameters to a surface data processing system during down hole operations.

20. The apparatus of claim 16, wherein each of the formation models comprises,
multiple resistivity values that each correspond to a respective formation boundary;
a transmitter frequency value; and
an antenna spacing value.

* * * * *